US012061211B2

(12) United States Patent
Rückert et al.

(10) Patent No.: US 12,061,211 B2
(45) Date of Patent: Aug. 13, 2024

(54) BOUNDARY LAYER PROBE, MEASURING ASSEMBLY, AND METHOD FOR DETERMINING A FLUID FLOW

(71) Applicant: TECHNISCHE UNIVERSITÄT BERLIN, Berlin (DE)

(72) Inventors: Roland Rückert, Berlin (DE); Mario Eck, Berlin (DE); Dirk Wieser, Berlin (DE); Dieter Peitsch, Berlin (DE)

(73) Assignee: TECHNISCHE UNIVERSITÄT BERLIN, Berlin (DE)

( * ) Notice: Subject to any disclaimer, the term of this patent is extended or adjusted under 35 U.S.C. 154(b) by 935 days.

(21) Appl. No.: 17/046,008

(22) PCT Filed: Apr. 12, 2019

(86) PCT No.: PCT/EP2019/059433
§ 371 (c)(1),
(2) Date: Oct. 8, 2020

(87) PCT Pub. No.: WO2019/197614
PCT Pub. Date: Oct. 17, 2019

(65) Prior Publication Data
US 2021/0072013 A1    Mar. 11, 2021

(30) Foreign Application Priority Data

Apr. 12, 2018   (EP) .................................. 18167059

(51) Int. Cl.
*G01P 5/14*   (2006.01)
*G01F 1/20*   (2006.01)
(Continued)

(52) U.S. Cl.
CPC ................ *G01P 5/14* (2013.01); *G01F 1/206* (2013.01); *G01F 1/34* (2013.01); *G01F 1/36* (2013.01)

(58) Field of Classification Search
CPC ... G01F 1/206; G01F 1/34; G01F 1/36; G01P 5/14
See application file for complete search history.

(56) References Cited

U.S. PATENT DOCUMENTS

| | | | | |
|---|---|---|---|---|
| 3,832,903 A | * | 9/1974 | Fletcher .................... | G01P 5/14 73/182 |
| 2003/0164049 A1 | * | 9/2003 | Oddie ....................... | G01F 1/34 73/152.36 |

(Continued)

FOREIGN PATENT DOCUMENTS

DE   19724116 A1   12/1998
EP    1314985 A1    5/2003

(Continued)

OTHER PUBLICATIONS

C. Ma et al "A Study of Directional MEMS Dual-fences Gauge", Proceedings of the 10th IEEE International Conference on Nano/Micro Engineered and Molecular Systems (IEEE-NEMS 2015).
International Search Report and Written Opinion of the International Searching Authority, issued in PCT/EP2019/059433, mailed Jun. 26, 2019; ISA/EP.

*Primary Examiner* — Jonathan M Dunlap
(74) *Attorney, Agent, or Firm* — Harness, Dickey & Pierce, P.L.C.

(57) ABSTRACT

The invention relates to a boundary layer probe for determining a fluid flow, comprising a measuring surface which is formed on a probe wall and with which a fluid flow to be determined is in contact during a measuring operation. The boundary layer probe also comprises an assembly of measuring obstacles that are formed in the region of the measuring surface as obstacles which disrupt the fluid flow in a flow region adjacent to the measuring surface, each of which has an elongated obstacle course extending over a particular obstacle length, and which are arranged at substantially equidistant angular distances in the circumferential direction. The boundary layer probe additionally has pressure (Continued)

measuring points, each of which is radially adjacent to an associated obstacle in order to detect a local pressure in the region of the measuring surface. The invention additionally relates to a measuring assembly and to a method for determining a fluid flow.

14 Claims, 3 Drawing Sheets

(51) Int. Cl.
  *G01F 1/34* (2006.01)
  *G01F 1/36* (2006.01)

(56) References Cited

U.S. PATENT DOCUMENTS

| | | | |
|---|---|---|---|
| 2014/0124057 A1* | 5/2014 | Freund | F24F 11/74 |
| | | | 702/47 |
| 2016/0334253 A1* | 11/2016 | Querry | G01P 5/14 |

FOREIGN PATENT DOCUMENTS

| FR | 3024665 A1 * | 2/2016 | B01D 46/24 |
|---|---|---|---|
| GB | 2491167 A * | 11/2012 | B64C 7/00 |
| GB | 2496526 A * | 5/2013 | G01B 13/10 |
| WO | WO-9315388 A1 | 8/1993 | |
| WO | WO-0140741 A1 * | 6/2001 | G01F 1/363 |
| WO | WO-2015114251 A1 * | 8/2015 | G01F 1/3263 |

* cited by examiner

BOUNDARY LAYER PROBE, MEASURING ASSEMBLY, AND METHOD FOR DETERMINING A FLUID FLOW

CROSS-REFERENCE TO RELATED APPLICATIONS

This application is a 371 U.S. National Phase of International Application No. PCT/EP2019/059433, filed Apr. 12, 2019, which claims priority to European Patent Application No. 18167059.7, filed Apr. 12, 2018. The entire disclosures of the above applications are incorporated herein by reference.

BACKGROUND

The so-called surface fence probe represents, in its simplest form having a single straight fence (obstacle), a proven and widely used measurement technology for determining wall shear stresses and flow velocities close to walls. The measuring principle consists in disrupting the fluid flow in the region close to the wall by means of a microscopically small obstacle (in this case a fence). Known boundary layer probes have pressure holes in front of and behind the fence, which can be combined as differential pressure. If the fence is overflowed, a damming region is created upstream and a release region downstream, or a positive pressure and a negative pressure, respectively. A 360° rotation of the probe provides the so-called angle characteristic—a differential pressure curve in cosine form. Using this curve, both the angle of the inflow and the absolute speed value can be determined. In order to record the angle characteristic, however, the probe must be completely rotated about itself once. This fact has many disadvantages. On the one hand, this eliminates the possibility of instantaneously measuring fluctuations in fluid movement and, on the other hand, the complexity of the measurement setup makes it unsuitable for many practical applications. Moreover, the measurement effort must be classified as comparatively high, because the probe has to be rotated 360° in equidistant steps.

The surface fence probe is also known as a boundary layer probe.

In fluid mechanics, wall shear stress is the tangentially acting force per unit area which is exerted by a fluid on walls about which it flows and, by definition, has one direction. The wall shear stress is the momentum flow through the volume of the fluid adjoining the wall and follows from the friction of the fluid elements against the wall and one another. In fluid mechanics, both the directional, vectorial shape and its magnitude are referred to as wall shear stress.

SUMMARY

The object of the invention is to specify a boundary layer probe, a measuring assembly and a method for determining a fluid flow by means of which the flow properties in the region close to the wall (boundary layer) can be determined in an improved manner.

A boundary layer probe, a measuring assembly and a method for determining a fluid flow according to independent claim 1 and dependent claims 12 and 13 are provided as the solution. Embodiments are the subject matter of dependent claims.

According to one aspect, a boundary layer probe for determining fluid flow is provided. The boundary layer probe has a measuring surface which is formed on a probe wall and with which a fluid flow to be determined is in contact during a measuring operation. An assembly of measuring obstacles is provided which are formed in the region of the measuring surface and which disrupt the fluid flow in a flow region adjacent to the measuring surface. The measuring obstacles each have an elongated obstacle course extending over a particular obstacle length. The measuring obstacles are arranged in the circumferential direction at substantially equidistant angular distances. The boundary layer probe has pressure measuring points, each of which is radially adjacent to an associated obstacle in order to detect a local pressure in the region of the measuring surface.

According to a further aspect, a measuring assembly for determining a fluid flow comprising the boundary layer probe is provided. The measuring assembly has a measuring chamber which is configured to receive a flow of a fluid flow to be determined, wherein the flow can flow along a probe wall of the boundary layer probe having a measuring surface formed thereon. A pressure measuring device is provided which is configured to detect a local pressure in each case at pressure measuring points in the region of the measuring surface of the boundary layer probe.

According to another aspect, a method for determining a wall shear stress for a fluid flow is provided in which a boundary layer probe is provided and a flow of a fluid flow to be determined is formed in a measuring chamber. The flow here flows along a probe wall of the boundary layer probe having a measuring surface formed thereon. Measured pressure values for a local pressure are recorded at pressure measuring points in the region of the measuring surface of the boundary layer probe, wherein differential pressures are recorded for adjacent pressure measuring points. By evaluating the measured pressure values, at least one physical measured variable is determined for a boundary layer of the fluid flow on the measuring surface of the boundary layer probe, wherein the at least one physical measured variable is selected from the following group: flow velocity and wall shear stress.

In determining the fluid flow, provision can be made to determine a direction of the fluid flow.

The measuring obstacles arranged in the circumferential direction at substantially equidistant angular distances form an efficient assembly of measuring obstacles in order to determine physical measured variables for the boundary layer of the fluid flow on the measuring surface, for example the wall shear stress, in particular with regard to magnitude and/or direction. The measuring obstacles form an assembly of microscopic obstacles that disrupt the fluid flow to be determined in its boundary layer region (region close to the wall for the measuring surface of the boundary layer probe) when it flows along the measuring surface on the probe wall. This creates characteristic pressure conditions in the region of the measuring surface which are measured with the aid of the pressure measuring points in order to determine one or more physical measurement or characteristic variables for the fluid flow in the region near the wall.

The measuring surface can be formed having different surface peripheral shapes, for example a round or angular shape. The boundary layer probe may be integrated into a wall of a flow channel or pipe through which the fluid flow flows. In this case, the measuring surface can be formed by a wall portion of the wall.

The obstacles of the assembly of measuring obstacles can all be designed identically or differently, in particular with regard to their elongated obstacle course and/or an obstacle height or depth.

On the basis of the recorded differential pressure values, the physical measured variable can be determined, in particular the wall shear stress, as is known per se in conjunction with a boundary layer probe.

The obstacles can be arranged rotationally symmetrically in the region of the measuring surface. This means that the obstacles can be brought to coincide with one another by rotating the measuring surface about a center point of the assembly of measuring obstacles.

The elongated obstacle course can extend at least in portions along a curved line. Alternatively, the elongated obstacles can have a straight design. A combination of one or more curved or arched portions and one or more straight portions can be provided in the elongated obstacle course. It has been found that such an obstacle formation is also advantageous, in particular at higher fluid velocities at which the compressibility of the fluid to be measured is no longer negligible. Usually this applies to fluid Mach numbers that are larger than 0.3. The Mach number is a dimensionless parameter in fluid mechanics for speeds. It indicates the ratio of the speed v (for example, of a body or a fluid) to the speed of sound of the surrounding fluid.

For concave or convex obstacle courses, it has been found that such a design is particularly advantageous at higher fluid speeds, for example at speeds which are characterized by a Mach number of at least about 0.4 or at least approximately 0.5.

For concave or convex obstacle courses, it has been found that such a design is particularly advantageous at higher fluid speeds at which the compressibility of the fluid to be measured is no longer negligible. Usually this applies to fluid Mach numbers that are larger than 0.3.

In one embodiment, a central portion of the elongated obstacle course for the obstacles is curved or arched. The central portion is adjoined on both sides by straight portions of the obstacle course that are directed radially outward. The elongated obstacle course can be designed continuously or so as to have interruptions for the obstacles.

The elongated obstacle course can be curved concavely or convexly in relation to a center point or a center of the assembly of measuring obstacles. Alternatively, the elongated obstacle course can be curved away from this path in relation to the center of the assembly of measuring obstacles. In these or other embodiments, a radius of curvature in the curved portion of the elongated obstacle course can be the same for all obstacles in the assembly. Alternatively, different radii of curvature can be provided. For concave or convex obstacle courses, it has been found that such a design is particularly advantageous at higher fluid velocities at which the compressibility of the fluid to be measured is no longer negligible. Usually this applies to fluid Mach numbers that are larger than 0.3.

Distal end portions of adjacent measuring obstacles can be arranged adjacent to one another on one or both sides. The distal end portions, that is to say the portions of the elongated obstacle courses that are arranged radially on the outside, can terminate at the circumferential outer edge of the measuring surface. Alternatively, the end of the distal end portion is arranged spaced radially inward from the outer edge. The adjacent arrangement of the distal end portions can be parallel or wedge-shaped. The adjacent course can abut the outer edge of the measuring surface or terminate at a distance therefrom.

The distal end portions of the adjacent measuring obstacles can be connected to one another. In this way, a closed course of the obstacles can be formed, be it in a circle, star or polygon shape. Corner regions can be formed in the region of the connection between the ends of adjacent measuring obstacles.

The pressure measuring points can each be arranged in a central portion of the associated obstacle. A pressure measuring point associated with the particular obstacle can be arranged in the center of the elongated obstacle course.

The obstacles can each be formed having at least one obstacle shape from the following group: a web or fence protruding on the measuring surface, and a recess arranged on the measuring surface, for example in the form of a trench. The obstacle shapes can be continuous or interrupted for the obstacles. As an alternative (to the curved obstacle course), obstacles formed by means of a recess are suitable for higher fluid velocities at which the compressibility of the fluid to be measured is no longer negligible. Usually this applies to fluid Mach numbers that are larger than 0.3. Recessed obstacles can also be provided in addition to the curved obstacle course of in order to support the suitability of the measuring assembly also for higher fluid velocities.

The assembly of measuring obstacles can have at least three obstacles. The number of pressure measuring openings can be equal to the number of obstacles. The at least three obstacles can be designed so as to be separate from one another or connected to one another. Optionally, with the at least three obstacles, a closed obstacle course can be formed in which at least one pressure measuring point is associated with each of the obstacles.

The pressure measuring points can be designed having a particular pressure measuring opening, which can open at the rear into an associated channel portion which has a connection for the pressure measuring device. The channel portion can extend transversely to this on the rear side of the measuring surface. A channel cross section can change. For example, a channel portion directly adjoining the pressure measuring opening can be formed having a first channel cross section, whereas a channel portion adjoining this on the rear side has a second channel cross section which is larger than the first channel cross section. In relation to the measuring surface of the boundary layer probe, a connection for the pressure measuring device can be arranged at a distal end of the channel portion.

Alternatively, one or more of the pressure measuring points can be formed having a pressure measuring device arranged on the measuring surface, for example a pressure-sensitive measuring film that can optionally be at least partially embedded in an associated opening or is arranged on the measuring plane.

Exactly one pressure measuring point can be associated with each of the measuring obstacles. Alternatively, more than one pressure measuring point can be associated with one or more of the measuring obstacles.

In conjunction with the measuring assembly and the method for determining the fluid flow, the embodiments explained above for the boundary layer probe can be provided accordingly.

In the method, the measured pressure values can be recorded in a time-resolved manner, from which physical measured variables can be determined in terms of magnitude and/or direction as a function of time, for example the wall shear stress and/or a flow velocity in the boundary layer region of the fluid flow on the measuring surface.

The direction of the physical measured variable, in particular the direction of the wall shear stress, of the fluid flow can be determined free of a rotation of the measuring surface having the measuring obstacles. In this embodiment it is not necessary and not provided to rotate the probe wall having the measuring surface in order to record measured pressure values from which the direction of the wall shear stress can be determined. Rather, the measuring surface remains stationary while the fluid flow to be determined flows thereon.

DESCRIPTION OF EMBODIMENTS

Further embodiments are explained in detail below with reference to the drawings, in which.

Figure 1:
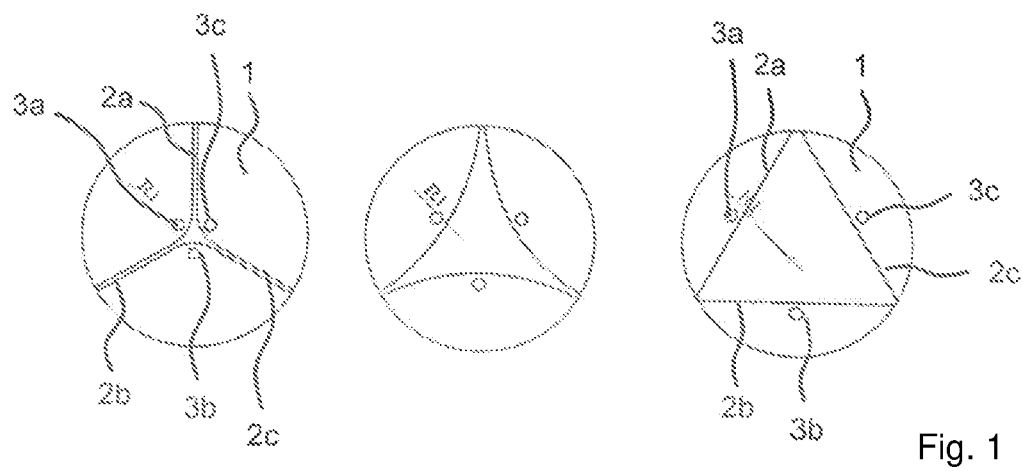
FIG. 1 is a schematic representation of measuring surfaces of a boundary layer probe having different assemblies of measuring obstacles.

FIG. 1 shows a schematic representation of a measuring surface 1 of a boundary layer probe for determining a fluid flow, in particular the direction of the fluid flow, having different assemblies a), b) and c) of measuring obstacles 2a, 2b, 2c, which are formed as forward-protruding microscopic webs or recesses placed in the measuring surface 1 in such a way that a fluid flow to be determined, which flows past the measuring surface 1, is locally disrupted by the measuring obstacles 2a, 2b, 2c, so that local pressure conditions are established which then can be tapped in pressure measuring points 3a, 3b, 3c, each which is associated with one of the measuring obstacles 2a, 2b, 2c.

In conjunction with the pressure measuring points 3a, 3b, 3c, it can be provided that each of these is formed having a pressure measuring opening in the region of the measuring surface 1 via which the local pressure can be measured. Alternatively, a particular pressure measuring device can be arranged on the measuring surface 1, for example in the form of a pressure-sensitive film, in order to measure the local pressure.

In the assembly a) of measuring obstacles 2a, 2b, 2c, said measuring obstacles are rounded in the center by a defined radius R1. An increase in R1 (from left to right in FIG. 1) results in different sensor geometries. The extreme, R1=∞, creates a triangular obstacle (cf. assembly c)). Furthermore, the variation of the number $n_s$ of the measuring obstacles 2a, 2b, 2c can be provided. Infinite radii would then lead to n-cornered obstacles. An infinite number of webs having infinitely large radii in the center ultimately result in a circular shape, wherein the number of pressure measuring points about the circle must be kept finite.

Figure 2:
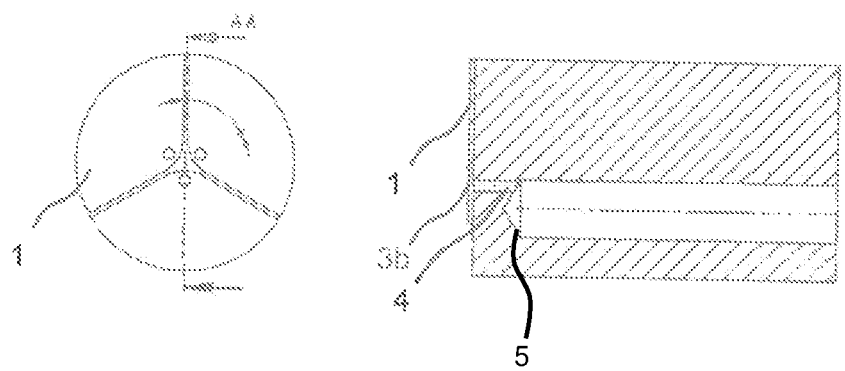
FIG. 2 is a schematic representation of one of the measuring surfaces from FIG. 1 and a sectional view thereof.

In this context, FIG. 2 shows a schematic illustration of the assembly a) of measuring obstacles 2a, 2b, 2c, wherein a sectional view is shown on the right-hand side in which behind the pressure measuring opening a channel 4 having a first and a second channel portion 4a, 4b is shown that extends transversely to the measuring surface 1 at the rear of the pressure measuring opening. A pressure measuring device (not shown) can be connected to the end 5 of the channel 4 in order to measure the pressure.

Figure 3:
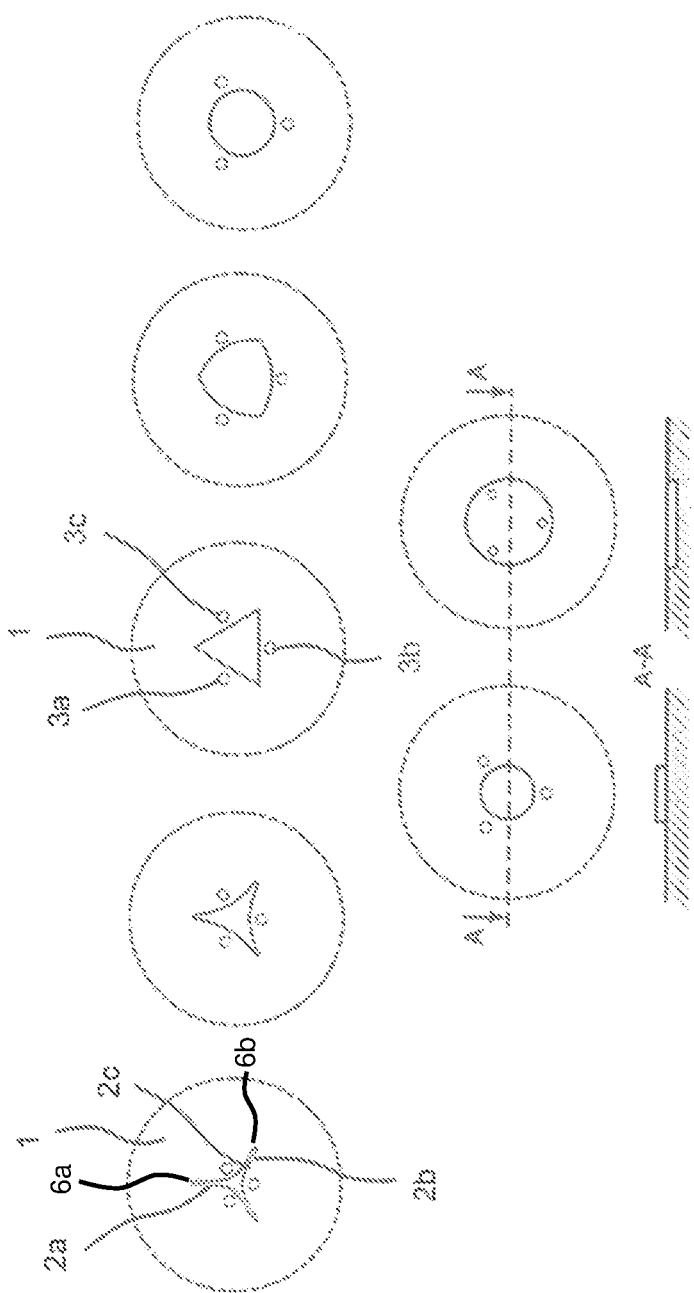
FIG. 3 is a schematic representation of further measuring surfaces of a boundary layer probe having different assemblies of measuring obstacles and pressure measuring points.

FIG. 3 shows further embodiments for a boundary layer probe, in which an assembly of measuring obstacles 2a, 2b, 2c is arranged on the measuring surface 1. Here, distal end portions 6a, 6b of adjacent measuring obstacles are connected to one another, so that a continuous course is produced.

The first four of the embodiments shown in the upper part of FIG. 3 differ from the embodiment shown on the far right in that corner regions are formed where the ends of adjacent obstacles meet, which is not the case with the embodiment shown on the far right (round course of the obstacle). This also applies to the examples of obstacle courses shown in the center in FIG. 3.

It has been found that the curved obstacle formation (cf. in particular FIGS. 1 and 3) is particularly advantageous at higher fluid speeds at which the compressibility of the fluid to be measured is no longer negligible. Usually this applies to fluid Mach numbers that are larger than 0.3.

Figure 4:
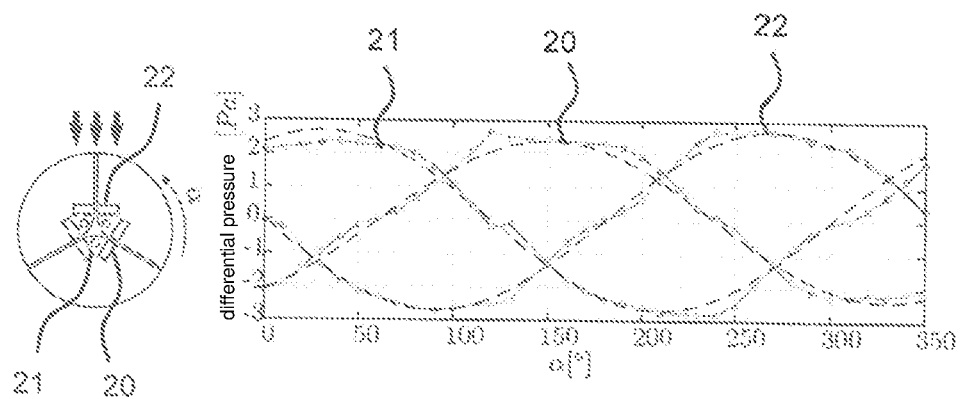
FIG. 4 is a schematic representation of differential pressure curves as a function of the angle of rotation.
Figure 5:
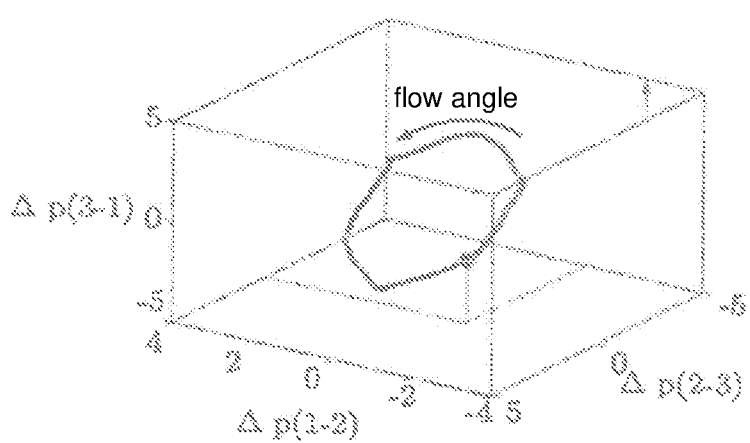
FIG. 5 is a schematic representation for a 4D calibration curve.

FIGS. 4 and 5 show differential pressure curves and a 4D calibration curve.

FIG. 4 shows results of measurements. Analogous to the known boundary layer probe with boundary layer fence, the differential pressure curves are used as a basis for evaluation. In each case two pressures are combined to form a measured value in the form of a differential pressure.

Three phase-shifted, harmonic differential pressure curves 20, 21, 22 can be recognized very well and are very similar to the angle characteristics of the classic boundary layer fence. On the left-hand side in FIG. 4, the reference signs 20, 21, 22 are also schematically associated with the two pressure measuring points, for each of which the course of the pressure difference is shown in the diagram in FIG. 4. In the case of a constant installation position a, there is a combination of three differential pressure values which indicate a clear flow direction. One possibility is the direct calibration of the boundary layer probe, in which the three differential pressures are plotted as a function of the flow angle (cf. FIG. 5).

Other approaches to angular calibration of the probe can also be used. One method is to analytically calculate the flow angle using the three differential pressures:

$$\beta_{flow}=f(\Delta p(1-2),\Delta p(2-3),p\Delta(3-1))$$

Both the flow angle and the maximum differential pressure that occurs (ideally at 30°±n 120°n∈N) can be determined with only a single installation position. There is therefore no need to turn the probe.

An alternative evaluation algorithm is based on a linearization of the angle characteristics mentioned above. At least two differential pressures are required for linear interpolation. In the present case there are three. A boundary layer probe having n webs in the simplest case would supply n differential pressure values and further improve the angle determination.

Potential use cases are numerous. A robust, inexpensive and reliable measuring unit is required in order to measure flows on objects of all kinds. The technology disclosed here can be used for this. These include, for example in any order the turbo machine and automotive industries, manufacturers of wind turbines, and aircraft manufacturers. Because the presented approach promises to also be able to determine the static pressure applied, one unit of the sensor type described would be sufficient to be able to map an extensive range of relevant measurement data. Previously, this required multiple that were unaffordable systems and could only be used in certain applications.

With the probe technology presented here, flow information is available for the first time which up to now could only be more or less reliably mapped using complex computer models. The validation and further development of existing simulation technology based on the information that is now available is also conceivable.

The features disclosed in the above description, the claims and the drawings may be relevant to implementing the different embodiments both individually and also in any combination.

The invention claimed is:

1. A boundary layer probe for determining a fluid flow, comprising:
   a measuring surface which is formed on a probe wall and with which a fluid flow to be determined is in contact during a measuring operation;
   an assembly of measuring obstacles which
      are formed in the region of the measuring surface as obstacles which disrupt the fluid flow in a flow region adjacent to the measuring surface,
      each measuring obstacle in the assembly of measuring obstacles has an elongated obstacle course extending over a particular obstacle length and being curved in a concave manner, and
      the measuring obstacles of the assembly of measuring obstacles are arranged at substantially equidistant angular distances in the circumferential direction and are directly connected to one another so that a closed obstacle course is formed; and
   pressure measuring points, each of which is radially adjacent to an associated obstacle in order to detect a local pressure in the region of the measuring surface.

2. The boundary layer probe according to claim 1, wherein the obstacles are arranged rotationally symmetrically in the region of the measuring surface.

3. The boundary layer probe according to claim 1 wherein the elongated obstacle course extends at least in portions along a curved line.

4. The boundary layer probe according to claim 1, wherein distal end portions of adjacent measuring obstacles are arranged adjacent to one another.

5. The boundary layer probe according to claim 4, wherein the distal end portions of the adjacent measuring obstacles are connected to one another.

6. The boundary layer probe according to claim 1, wherein the pressure measuring points are each arranged in a central portion of the associated obstacle.

7. The boundary layer probe according to claim 1, wherein the obstacles are each formed having at least one obstacle shape from the following group:
   web protruding on the measuring surface and
   recess arranged on the measuring surface.

8. The boundary layer probe according to claim 1, wherein the assembly of measuring obstacles has at least three obstacles.

9. The boundary layer probe according to claim 1, wherein one or all of the pressure measuring points are each formed having a pressure measuring opening to which a pressure measuring device can be coupled.

10. The boundary layer probe according to claim 1, wherein exactly one pressure measuring point is associated with each of the measuring obstacles.

11. A measuring assembly for determining a fluid flow, comprising
   a boundary layer probe according to claim 1;
   a measuring chamber which is configured to receive a flow of a fluid flow to be determined, wherein the flow can flow along a probe wall of the boundary layer probe having a measuring surface formed thereon; and
   a pressure measuring device which is configured to detect a local pressure at each pressure measuring point in the region of the measuring surface of the boundary layer probe.

12. A method for determining a fluid flow, comprising
   providing a boundary layer probe according to claim 1;
   forming a flow of a fluid flow to be determined in a measuring chamber, wherein the flow here flows along a probe wall of the boundary layer probe having a measuring surface formed thereon;
   recording measured pressure values for a local pressure at pressure measuring points in the region of the measuring surface of the boundary layer probe, wherein here differential pressures are recorded for adjacent pressure measuring points; and
   determining at least one physical measured variable for a boundary layer of the fluid flow on the measuring surface of the boundary layer probe by evaluating the measured pressure values, wherein the at least one physical measured variable is selected from the following group: flow velocity and wall shear stress.

13. The method according to claim 12, wherein the measured pressure values are recorded in a time-resolved manner.

14. The method according to claim 12, wherein the at least one physical measured variable is determined free of any rotation of the measuring surface having the assembly of measuring obstacles.

* * * * *